US007593142B2

(12) United States Patent
Marszalek et al.

(10) Patent No.: US 7,593,142 B2
(45) Date of Patent: Sep. 22, 2009

(54) APPARATUS, A SYSTEM AND A METHOD FOR DETECTING A SECURITY OF A DEVICE WITH AN OPTICAL SENSOR

(75) Inventors: Christopher Marszalek, Plainfield, IL (US); Daniel Horvath, Plainfield, IL (US); Sorin Petrusan, Chicago, IL (US); Jim Chmela, Algonquin, IL (US)

(73) Assignee: Sennco Solutions, Inc., Plainfield, IL (US)

( * ) Notice: Subject to any disclaimer, the term of this patent is extended or adjusted under 35 U.S.C. 154(b) by 951 days.

(21) Appl. No.: 11/054,285

(22) Filed: Feb. 9, 2005

(65) Prior Publication Data

US 2006/0174812 A1 Aug. 10, 2006

(51) Int. Cl.
*H04N 1/04* (2006.01)

(52) U.S. Cl. ....................... 358/474; 358/482; 358/483; 340/568.2; 340/692; 439/501; 439/917; 174/50; 174/559

(58) Field of Classification Search ................. 358/513, 358/509, 475, 482, 906, 909.1; 348/169, 348/46, 159; 340/568.3, 568.4, 506, 687; 439/501, 917; 174/50, 559, 58, 64
See application file for complete search history.

(56) References Cited

U.S. PATENT DOCUMENTS

| | | | |
|---|---|---|---|
| 4,896,140 A | 1/1990 | Biever et al. | |
| 5,066,942 A | 11/1991 | Matsuo | |
| 5,072,213 A * | 12/1991 | Close | 340/568.2 |
| 5,124,685 A | 6/1992 | Rankin | |
| 5,172,098 A | 12/1992 | Leyden et al. | |
| 5,552,771 A | 9/1996 | Leyden et al. | |
| 5,565,848 A | 10/1996 | Leyden et al. | |
| 5,676,258 A | 10/1997 | Leyden et al. | |
| 6,019,304 A | 2/2000 | Skowronski et al. | |
| 6,027,277 A | 2/2000 | Leyden et al. | |
| 6,039,498 A | 3/2000 | Leyden et al. | |
| 6,087,939 A | 7/2000 | Leyden et al. | |
| RE37,590 E | 3/2002 | Leyden et al. | |
| 6,386,906 B1 | 5/2002 | Burke | |
| 6,495,756 B1 | 12/2002 | Burke et al. | |

(Continued)

FOREIGN PATENT DOCUMENTS

GB 2 128 790 A 5/1984

*Primary Examiner*—Houshang Safaipour
*Assistant Examiner*—Negussie Worku
(74) *Attorney, Agent, or Firm*—Patents + TMS, P.C.

(57) ABSTRACT

An apparatus, a system and a method secure a device and/or a removable attachment of the device with an optical sensor. Additionally, the apparatus, the system and the method attach and/or secure the device and/or the removable attachment to a structural element. A base, a spring and/or a screw connect the device to an alarm box, a power source and/or the structural element. The alarm box and/or the power source communicate with the optical sensor and/or the device via a cable to secure the device and/or the attachment of the device. A programmable logical device controls a voltage from the power source and transmits the voltage to the device. A first LED and/or a second LED indicate that the voltage is provided to the device and that the removable attachment is secured. The optical sensor has a photo emitter and/or a photo receiver to secure the device and/or the removable attachment of the device to a structural element.

20 Claims, 3 Drawing Sheets

U.S. PATENT DOCUMENTS

| | | | | |
|---|---|---|---|---|
| 6,756,900 | B2 | 6/2004 | Leyden et al. | |
| 6,761,579 | B2 | 7/2004 | Fort et al. | |
| 6,799,994 | B2 | 10/2004 | Burke | |
| 7,154,039 | B1 * | 12/2006 | Marszalek et al. | 174/50 |
| 7,202,786 | B2 * | 4/2007 | Marszalek et al. | 340/568.3 |
| 7,327,276 | B1 * | 2/2008 | Deconinck et al. | 340/687 |
| 2007/0152819 | A1 * | 7/2007 | Marszalek et al. | 340/568.4 |

* cited by examiner

APPARATUS, A SYSTEM AND A METHOD FOR DETECTING A SECURITY OF A DEVICE WITH AN OPTICAL SENSOR

BACKGROUND OF THE INVENTION

The present invention generally relates to an apparatus, a system and a method for detecting a security of a device with an optical sensor. More specifically, the present invention relates to an apparatus, a system and a method for detecting a security of a portable device and/or a removable attachment of the portable device with an optical sensor. The apparatus, the system and the method for detecting the security of the device with the optical sensor which may prevent theft of the device and/or the removable attachment of the device. The device and/or the removable attachment may be displayed and/or may be displayed for sale by, for example, a retailer, a wholesaler and/or the like.

The apparatus, the system and the method for detecting a security of a device with an optical sensor may have a base which may attach to the device. A screw and/or a spring may be inserted through the base and into the device to secure and/or to attach the device to the base. The base may be attached and/or may be secured to a structural element. The optical sensor may be an infrared sensor and/or may include an optical emitter and an optical receiver. The optical sensor may detect that the screw may be unattached to the device and/or the device may be unsecured from the base and/or structural element. The base may detect that the removable attachment may have been detached from the base and/or the device. The optical sensor and/or the screw may signal an alarm box. As a result, the alarm box may be activated and/or may produce an audio signal. A power source may be in communication with a sensor board in the base and may provide a voltage to the device, the sensor board, the optical emitter and/or the optical receiver.

It is generally known, for example, that vendors, retailers and/or wholesalers may display a device at, for example, a retail store and/or a sales facility. The device may be a portable device, such as, for example, a camera, a digital camera, a portable compact disc player, a portable mini-disc player, a digital music player, a PDA, a laptop computer and/or a cellular telephone. The device may be connected to a structure within the retail store and/or sales facility. The structure may be a wall, a floor, a pillar, a support beam, a stair case or a fixture, such as, for example, a cabinet, a table, a shelf and/or the like.

The device is secured to the structure within the retail store and/or the sales facility by the cable and a mount. A pin, a screw or a bar may be used to attach the device to the mount. Alternatively, the mount may be one or more bars which may wrap around the device to secure the device to the structure. Often, the cable, the pin, the screw, the bar and/or the mount are not durable to prevent breaking and/or may allow the device to be easily separated from the cable and/or the mount.

A need, therefore, exists for an apparatus, a system and a method for detecting a security of a device with an optical sensor. Additionally, a need exists for an apparatus, a system and a method for detecting a security of a device with an optical sensor which may provide mechanical security and/or electrical security to the device. Further, a need exists for an apparatus, a system and a method for detecting a security of a device with an optical sensor which may provide a spring loaded base to prevent theft of the device. Still further, a need exists for an apparatus, a system and a method for detecting a security of a device with an optical sensor which may prevent the device and/or the removable attachment of the device from being separated from the structural element. Moreover, a need exists for an apparatus, a system and a method for detecting a security of a device with an optical sensor which may activate an alarm to signal that the device and/or the removable attachment of the device has been separated from the base with the optical sensor.

SUMMARY OF THE INVENTION

The present invention relates to an apparatus, a system and a method for detecting a security of a device with an optical sensor. The device may be, for example, a portable device and may have a removable attachment thereon. Further, the apparatus, the system and the method for detecting a security of a device with an optical sensor may include a base, a spring and/or a screw for attaching to the device and/or the removable attachment of the device. The optical sensor may be in communication with an alarm box and/or a power source via a cable to secure the device. The base may have a first LED to indicate when a voltage may be provided to the device. The base may have a second LED to indicate when the device and/or the removable attachment may be separated from the base. The optical sensor may include, for example, a photo emitter and/or a photo receiver to secure the device and/or the removable attachment of the device to a structural element.

In an embodiment of the present invention, an apparatus for securing a device wherein the device has a removable attachment thereon is provided. The apparatus has a base having walls defining an interior wherein the base attaches to the device wherein the base has a top side and a bottom side opposite to the top side and further wherein the base has an opening extending through the base from the interior to the top side. Further, the apparatus has an optical sensor positioned on the interior of the base wherein the optical sensor is adjacent to the opening on the bottom side of the base and further wherein the optical sensor detects energy wherein the energy transverses the opening on the bottom side of the base. Still further, a screw having a base and a tip opposite to the base wherein the base of the screw is positioned within the interior of the base wherein the tip of the screw extends outward with respect to the top side of the base and further wherein the screw attaches the device to the base. Moreover, the apparatus has an alarm in communication with the optical sensor wherein a condition interrupts the energy received by the optical sensor and the alarm is activated.

It is, therefore, an advantage of the present invention to provide an apparatus, a system and a method for detecting a security of a device with an optical sensor which may mechanically secure and/or may electrically secure the device and/or a removable attachment of the device.

Another advantage of the present invention is to provide an apparatus, a system and a method for detecting a security of a device with an optical sensor which may secure the device and/or a removable attachment of the device to a structural element.

And, another advantage of the present invention is to provide an apparatus, a system and a method for detecting a security of a device with an optical sensor which may provide a base, a spring and/or screw for securing the device and/or a removable attachment of the device.

Yet another advantage of the present invention is to provide an apparatus, a system and a method for detecting a security of a device with an optical sensor which may visibly display that the device and/or a removable attachment of the device is electrically connected and/or mechanically secured to a sensor board.

A further advantage of the present invention is to provide an apparatus, a system and a method for detecting a security of a device with an optical sensor which may utilize a mounting hole and/or a tripod hole located on an underside of the device.

Moreover, an advantage of the present invention is to provide an apparatus, a system and a method for detecting a security of a device with an optical sensor which provides a voltage to the device.

And, another advantage of the present invention is to provide an apparatus, a system and a method for detecting a security of a device with an optical sensor having electromagnetic radiation to detect the security the device and/or a removable attachment of the device.

Yet, another advantage of the present invention is to provide an apparatus, a system and a method for detecting a security of a device with an optical sensor having a cable for detecting the security of the device and/or a removable attachment of the device.

Another advantage of the present invention is to provide an apparatus, a system and a method for detecting a security of a device with an optical sensor having a photo emitter and/or a photo detector to detect the security of the device and/or a removable attachment of the device.

Yet another advantage of the present invention is to provide an apparatus, a system and a method for detecting a security of a device with an optical sensor having an alarm box for signaling by the optical sensor when the device and/or a removable attachment of the device is unsecured.

A still further advantage of the present invention is to provide an apparatus, a system and a method for detecting a security of a device with an optical sensor having a light emitting source to detect the security of the device and/or a removable attachment of the device.

Moreover, an advantage of the present invention is to provide an apparatus, a system and a method for detecting a security of a device with an optical sensor which detects when the device and/or a removable attachment of the device are disconnected from the optical sensor.

And, another advantage of the present invention is to provide an apparatus, a system and a method for securing a device with an optical sensor which utilizes a beam of electromagnetic radiation to secure the device and/or a removable attachment of the device.

Additional features and advantages of the present invention are described in, and will be apparent from, the detailed description of the presently preferred embodiments and from the drawings.

DETAILED DESCRIPTION OF THE PREFERRED EMBODIMENTS

The present invention relates to an apparatus, a system and a method for detecting a security a device and/or a removable attachment of the device with an optical sensor. Further, the apparatus, the system and the method for detecting a security a device and/or a removable attachment of the device with an optical sensor may include a base, a spring and/or a screw for attaching to the device. The optical sensor may include a photo emitter and/or a photo detector. The optical sensor may detect electromagnetic energy to detect the security of the device and/or the removable attachment of the device. The optical sensor may be in communication with an alarm box and/or a power source via a cable to detect the security of the device and/or the removable attachment of the device.

Figure 1:
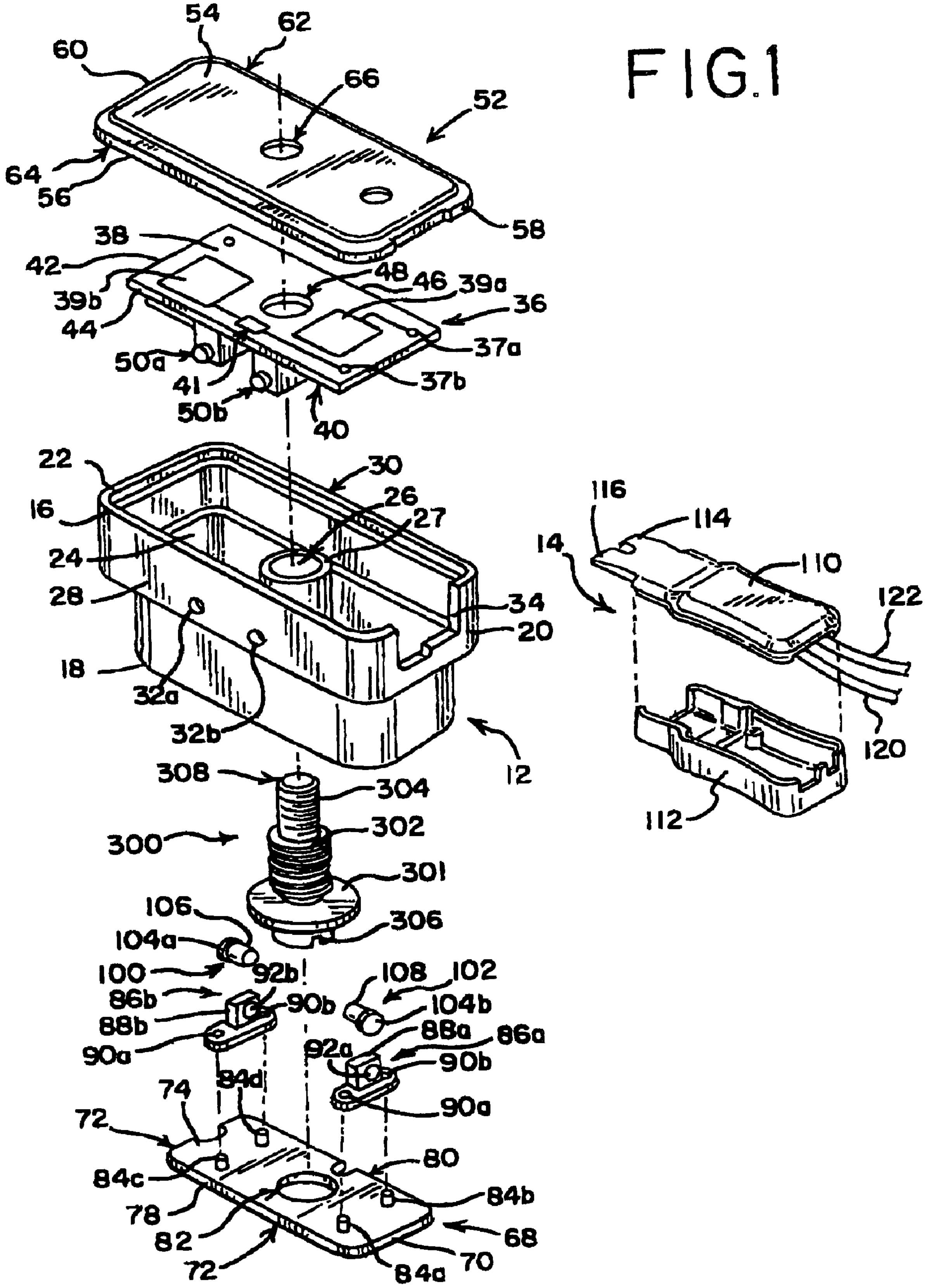
FIG. 1 is an exploded perspective view of a connector plug and a base with an optical sensor in an embodiment of the present invention.
Figure 2:
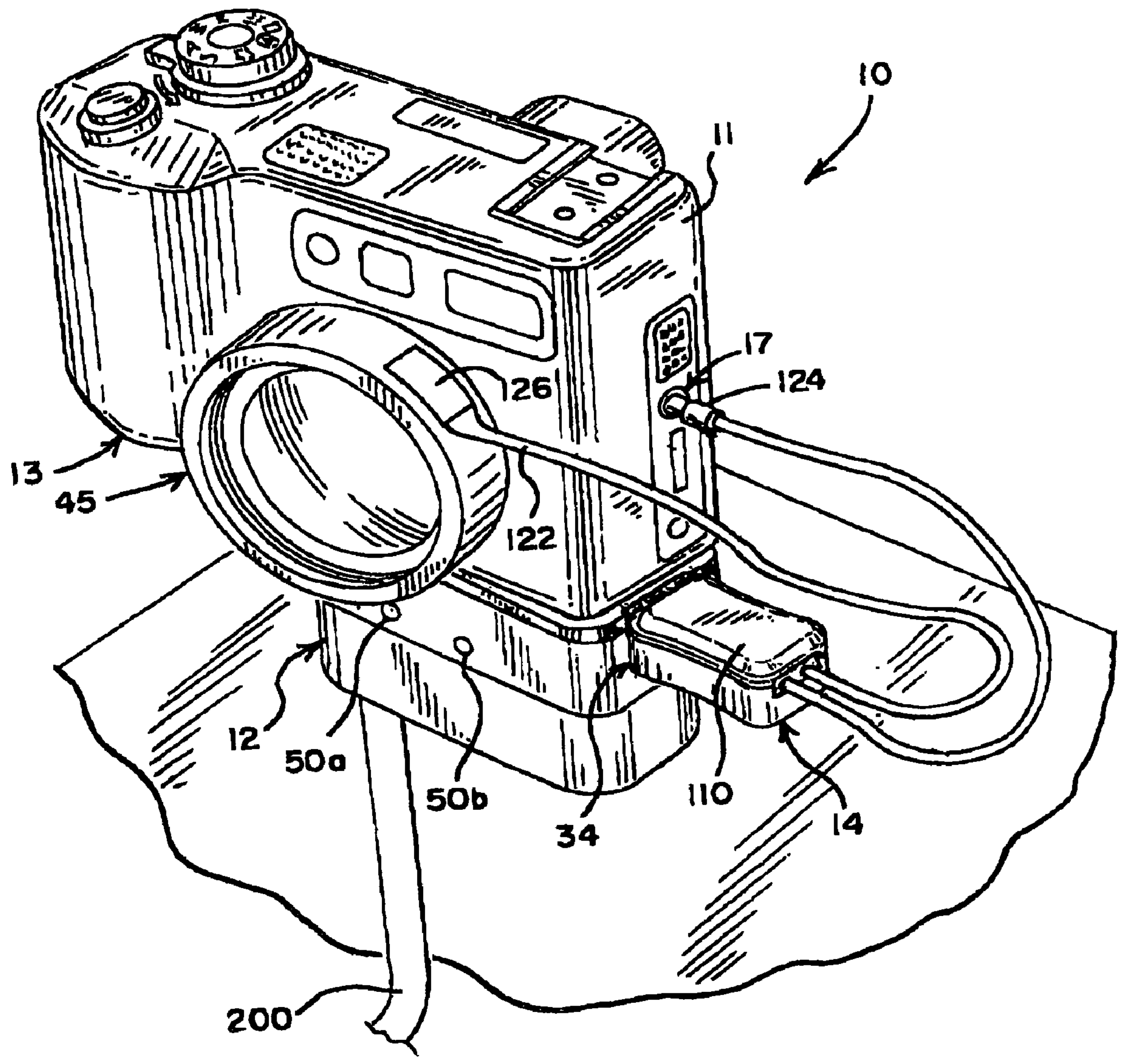
FIG. 2 is a perspective view of the device attached to a system in an embodiment of the present invention.
Figure 3:
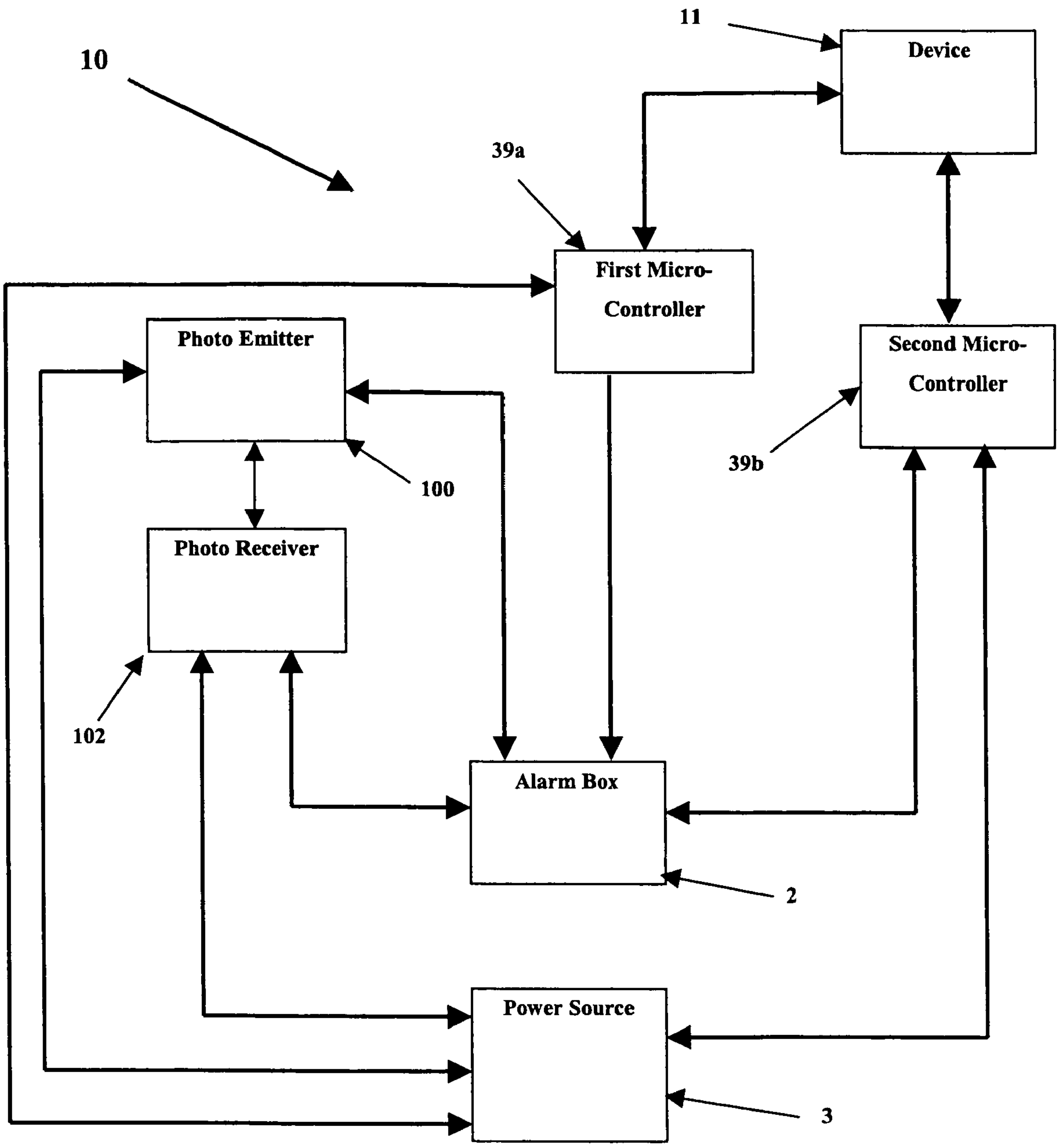
FIG. 3 is a black box diagram of a system in an embodiment of the present invention.

Referring now to the drawings wherein like numerals refer to like parts, FIGS. 1-3 illustrate a device 11 and a system 10 which may include an alarm box 2, a power source 3, a base 12 and/or a connector plug 14. The base 12 may have a top side 16 and/or a bottom side 18 wherein the bottom side 18 is opposite to the top side 16. The base 12 may have a first end 20 and/or a second end 22 wherein the second end 22 is opposite to the first end 20.

The base 12 may have a cavity 24 which may extend inward with respect to the top side 16 of the base 12. The base 12 may have an opening 26 which may extend through the base 12 from the cavity 24 to the bottom side 18. A ring 27 may encircle the opening 26 and/or may extend outward with respect to the cavity 24. The base 12 may have a front side 28 and/or a back side 30 wherein the back side 30 is opposite to the front side 28.

As illustrated in FIGS. 1 and 2, the front side 28 of the base 12 may have a first hole 32*a* and/or a second hole 32*b*. The holes 32*a*, 32*b* may extend through the base 12 from the cavity 24 to the front side 28 of the base 12. The first end 20 may have a slot 34 which may extend inward with respect to the top side 16 of the base 12. The slot 34 may extend through the base from the first end 20 to the cavity 24 of the base 12.

The base 12 may include a sensor board 36 which may have a top side 38 and/or a bottom side 40 wherein the bottom side 40 is opposite to the top side 38. The sensor board 36 may a first end 43 and/or a second end 42 wherein the second end 42 is opposite to the first end 43. The sensor board 36 may have a front side 44 and/or a back side 46 wherein the back side 46 is opposite to the front side 44. The top side 38 of the sensor board 36 may have a first head 37*a* and/or a second head 37*b* wherein the heads 37*a*, 37*b* may extend inward with respect to the top side 38 of the sensor board 36.

As illustrated in FIG. 1, the sensor board 36 may have an opening 48 which may extend through the sensor board 36 from the top side 38 to the bottom side 40. The sensor board 36 may include a first light emitting diode (LED) 50*a* and/or a second LED 50*b*. The LEDs 50*a*, 50*b* may be attached to the bottom side 40 of the sensor board 36.

The sensor board 36 may have one or more programmable logical devices, such as, for example, an electrical resistor 41, a first micro-controller 39*a* and/or a second micro-controller 39*b*. The first micro-controller 39*a* and/or the second micro-controller 39*b* may be attached to and/or may be connected to the sensor board 36. The first micro-controller 39*a* and/or the second micro-controller 39*b* may be in communication with and/or may control the first LED 50*a* and/or the second LED 50*b*. The first head 37*a* and/or the second head 37*b* may be connected to the second micro-controller 39*b* and/or the first micro-controller 39*a*, respectively. The first head 37*a* and/or the second head 37*b* may be connected to the second LED 50*b* and/or the first LED 50*a*, respectively.

The electrical resistor 41 may be located between, may be attached to and/or may be connected to the second head 37*b* and/or the second micro-controller 39*b* as illustrated in FIG. 1. The electrical resistor 41 may be in series with the second head 37*b* and/or the second micro-controller 39*b*. The electrical resistor 41 may connect the second head 37*b* to the second micro-controller 39*b*.

The cavity 24 of the base 12 may receive the sensor board 36. The sensor board 36 may be inserted into the cavity 24 of the base 12 and/or may abut the cavity 24 of the base 12. The first end 43 of the sensor board 36 may be adjacent to the first end 20 and/or the slot 34 of the base 12. The first end 43 of the sensor board 36 may abut the slot 34 of the base 12. The front side 44 and/or the back side 46 of the sensor board 36 may be adjacent to the front side 28 and/or the back side 30, respectively, of the base 12. The second end 42 of the sensor board 36 may be adjacent to the second end 22 of the base 12.

The bottom side 40 of the sensor board 36 may abut the ring 27 of the base 12. The opening 48 of the sensor board 36 may be aligned with the opening 26 of the base 12. The LEDs 50*a*, 50*b* may be aligned with and/or may be positioned within the holes 32*a*, 32*b*, respectively. As a result, the light emitted by the LEDs 50*a*, 50*b* may emit through the holes 32*a*, 32*b*, respectively. The base 12 may include a top cover 52 which may have a first side 58 and/or a second side 60 wherein the second side 60 is opposite to the first side 58. The top cover 52 may have a top side 54 and/or a bottom side 56 wherein the bottom side 56 is opposite to the top side 54 of the top cover 52. The top cover 52 may have a front side 64 and/or a back side 62 wherein the back side 62 is opposite to the front side 64 of the top cover 52. The top cover 52 may have an opening 66 which may extend through the top cover 52 from the top side 54 to the bottom side 56.

As illustrated in FIG. 1, the cavity 24 of the base 12 may receive the top cover 52 wherein the top cover 52 may be attached to the base 12. As a result, the top cover 52 may abut the cavity 24 of the base 12 and/or may abut the top side 38 of the sensor board 36. The top cover 52 may cover the cavity 24 of the base 12. As a result, the sensor board 36 may be enclosed by the cavity 24 and/or the top cover 52. The opening 66 of the top cover 52 may be aligned with the openings 48, 26 of the sensor board 36 and the base 12, respectively.

The base 12 may include a recession (not shown in the drawing) which may extend inward with respect to the bottom side 18 of the base 12. The base 12 may include a bottom cover 68 which may have a first end 70 and/or a second end 72 wherein the second end 72 is opposite to the first end 70. The bottom cover 68 may have a top side 74 and/or a bottom side 76 wherein the bottom side 76 is opposite to the top side 74. The bottom cover 68 may have a front side 78 and/or a back side 80 wherein the back side 80 is opposite to the front side 78 of the bottom cover 68.

The bottom cover 68 may have an opening 82 which may extend through the bottom cover 68 from the bottom side 76 to the top side 74. The opening 82 of the bottom cover 68 may be aligned with the opening 26 of the base 12. Moreover, the opening 82 of the bottom cover 68 may be aligned with the opening 48 of the sensor board 36 and/or the opening 66 of the top cover 52.

The bottom cover 68 may have a first notch 84*a* and/or a second notch 84*b* which may be adjacent to the first end 70 as illustrated in FIG. 1. The bottom cover 68 may have a third notch 84*c* and/or a forth notch 84*d* which may be adjacent to the second end 72. The notchs 84*a*, 84*c* may be adjacent to the front side 78 of the bottom cover 68. The notchs 84*b*, 84*d* may be adjacent to the back side 80 of the bottom cover 68. The first notch 84*a* and the second notch 84*b* may extend outward with respect to the top side 74 of the bottom cover 68.

The base 12 may include a first mount 86*a* and/or a second mount 86*b*. The first mount 86*a* may have a first arm 88*a*. The second mount 86*b* may have a second arm 88*b*. The first mount 86*a* and/or the second mount 86*b* may have a first groove 90*a* and/or a second groove 90*b*. The first arm 88*a* and the second arm 88*b* may have a first opening 92*a* and a second opening 92*b*, respectively.

The first notch 84*a* and the second notch 84*b* of the bottom cover 68 may be inserted into the first groove 90*a* and the second groove 90*b*, respectively, of the first mount 86*a*. As a result, the first mount 86*a* may be attached to the bottom cover 68. The first arm 88*a* of the first mount 86*a* may extend outward with respect to the top side 74 of the bottom cover 68.

The third notch 84*c* and the forth notch 84*d* of the bottom cover 68 may be inserted into the first groove 90*a* and the second groove 90*b*, respectively, of the second mount 86*b*. As a result, the second mount 86*b* may be attached to the bottom cover 68. The second arm 88*b* of the second mount 86*b* may extend outward with respect to the top side 74 of the bottom cover 68. The base 12 may include a photo emitter 100 and/or a photo receiver 102. The photo emitter 100 may have a first base 104*a* and/or a light emitting source 106. The light emitting source may be, for example, a light emitting diode. The photo emitter 100 may be attached to a power source 3. The power source 3 may provide a voltage to the photo emitter 100 and/or the light emitting source 106.

As illustrated in FIGS. 1 and 3, the voltage from the power source 3 may allow the light emitting source 106 to emit, for example, electromagnetic radiation. The electromagnetic radiation may be at a frequency, such as, for example, a radio frequency, a microwave frequency, an infrared frequency, a visible frequency and/or an ultraviolet frequency. The light emitting source 106 may be made from a material, such as, for example, aluminum gallium arsenide, gallium arsenide, aluminum gallium arsenide phosphide, indium gallium arsenide, and/or the like. It should be understood that the electromagnetic radiation may be at any frequency known to one having ordinary skill in the art. The present invention should not be deemed as limited to the embodiments of a specific material of the light emitting source 106.

The photo receiver 102 may be connected to an alarm box 2. The photo receiver 102 may have a second base 104*a* and/or a light detector 108. The light detector 108 may receive the electromagnetic radiation which may be emitted from the light emitting source 106 of the photo emitter 100. The light detector 108 may detect the electromagnetic radiation which may be emitted from the light emitting source 106 of the photo emitter 100. As a result, the photo detector 108 may receive and/or may detect the electromagnetic radiation of the photo emitter 100.

The photo emitter 100 may be inserted into the first opening 92*a* in the first arm 88*a* of the first mount 86*a*. As a result, the photo emitter 100 may be attached to the first mount 86*a* and/or may be connected to the bottom cover 68 of the base 12. The first base 104*a* may abut the first arm 88*a* of the first mount 86*a*. As a result, the light emitting source 106 of the photo emitter 100 may extend inward with respect to the opening 82 of the bottom cover 68.

The photo receiver 102 may be inserted into the second opening 92*b* in the second arm 88*b* of the second mount 86*b*. As a result, the photo receiver 102 may be attached to the second mount 96*b* and/or may be connected to the bottom cover 68 of the base 12. The light detector 108 may extend inward with respect to the opening 82 of the bottom cover 68. As a result, the light receiver 108 may be aligned with the light emitting source 106. Moreover, the light detector 108 may receive and/or may detect the electromagnetic radiation which may be emitted from the light emitting source 106.

Alternatively, the photo emitter 100 may be inserted into the second opening 92*b* in the second arm 90*b* of the second mount 86*b*, and the photo receiver 102 may be inserted into the first opening 92*a* in the first arm 90*a* of the first mount 86*a*. The photo receiver 102 may be attached to the first mount 86*a* and/or the bottom cover 68 of the base 12. The photo emitter 100 may be attached to the second mount 86*b* and/or the bottom cover 68 of the base 12. As a result, the light detector 108 may be aligned with the light emitting source 106. The light detector 108 may detect and/or may receive the electromagnetic radiation from the light emitting source 106.

As illustrated in FIG. 3, the light detector 108 may receive and/or may detect the electromagnetic radiation which may be emitted from the light emitting source 106. The electromagnetic radiation transmitted from the light emitting source 106 to the light receiver 108 may be continuous and/or constant and/or uniform and/or uninterrupted. The frequency of the electromagnetic radiation transmitted from the light emitting source 106 to the light detector 108 may be constant and/or continuous.

The device 11 may be a portable device, such as, for example, a camera, a digital camera, a compact disc player, a MP3 player, a PDA, a laptop computer, a cellular telephone and/or the like. Further, the device 11 may have an underside 13 and/or a mounting hole (not shown in the drawings). The mounting hole may be adapted to receive, for example, a screw and/or a pin from, for example, a tripod mount. As a result, the device 12 may be mounted on, for example, a tripod. The present invention should not be deemed as limited to the embodiments of a specific portable device.

As illustrated in FIG. 2, the device 11 may have a direct current plug-in 17 (hereinafter "DC plug-in 17"). The device 12 may require an operating voltage, such as, for example, three volts, five volts and/or the like. Each type of portable device may require a specific operating voltage. For example, a portable compact disc player may have an operating voltage of 4.5 volts, a cellular telephone may have an operating voltage of seven volts, and a digital camera may have an operating voltage of six volts. Further, the device 12 may require an operating current, such as, for example, a direct current. Moreover, the present invention should not be deemed as limited to the embodiments of a specific operating voltage and/or a specific operating current of the device 11.

The base 12 may be attached and/or may be connected to the structural element with the cable. The structural element may be a wall, a floor, a pillar, a support beam, a stair case or a fixture, such as, for example, a cabinet, a table, a shelf and/or the like. The present invention should not be deemed as limited to the embodiments of a specific structural element and/or a specific fixture 48.

The connector plug 14 may include a top element 110 and/or a bottom element 112 as illustrated in FIGS. 1 and 2. The top element 110 may be inserted into the bottom element 112. As a result, the top element 110 may be attached to the bottom element 112. The top element 110 may have a first flange 114 and/or a second flange 116. The first flange 114 and/or the second flange 116 may extend outward with respect to the top element 110 and/or the bottom element 112. The top element 110 may have, for example, a circuit board (not shown in the drawing) which may be attached to the first flange 114 and/or the second flange 116.

The connector plug 14 may include a first cord 120 and/or a second cord 122. The first cord 120 and/or the second cord 122 may be attached to the circuit board of the top element 110. As a result, the first cord 120 and/or the second cord 122 may be connected to the first flange 114 and/or the second flange 116, respectively. The first cord 120 may have, for example, a voltage plug 124. The second cord 122 may have an attaching means 126. The voltage plug 124 and/or the attaching means 126 may be opposite to the connector plug 14.

The first flange 114 and/or the second flange 116 may be inserted into the slot 34 of the base 12. As a result, the connector plug 14 may be connected and/or may be attached to the base 12. The first flange 114 and/or the second flange 116 may abut and/or may contact the first head 37*a* and/or the second head 37*b*, respectively. As a result, the connector plug 14 may be connected to the first head 37*a* and/or the second head 37*b*. The first flange 114 and/or the second flange 116 may be connected to the first micro-controller 39*a* and/or the second micro-controller 39*b*, respectively. As a result, the first cord 120 and/or the second cord 122 may be connected to the first micro-controller 39*a* and/or the second micro-controller 39*b*, respectively.

The cable 200 may include one or more wires, such as, for example, an electrical wire or wires and/or a mechanical wire or wires. The cable 200 may provide a number of electrical pathways between the photo emitter, 100, the photo receiver 102, the first micro-controller 39*a*, the second micro-controller 39*b* and/or sensor board 36 and the alarm box 2 and/or the power source 3. The number of electrical pathways may be determined by a number of electrical signals that may be communicated between the photo emitter 100, the photo receiver 102, the first micro-controller 39*a*, the second micro-controller 39*b* and/or the sensor board 36 and the alarm box 2 and/or the power source 3. For example, the cable 200 may provide, for example, three electrical pathways, such as, for example, a voltage pathway, a data transmission pathway and/or an alarm signal pathway between the photo emitter 100, the photo receiver 102, the first micro-controller 39*a*, the second micro-controller 39*b* and/or the sensor board 36 and the alarm box 2 and/or the power source 3. The cable 200 may transmit, for example, power, a voltage, a current, a communication signal, a video-signal, and/or an audio-signal between the photo emitter 100, the photo receiver 102, the first micro-controller 39*a*, the second micro-controller 39*b* and/or the sensor board 36 and the alarm box 2 and/or the power source 3. Further, the cable 200 may transmit, for example, power from the power source 3 to the device 11. Still further, the cable 200 may transmit, for example, a video-signal and/or an audio-signal received from the device 11. The cable 200 may be made from a material, such as, for example, copper and/or the like. The present invention should not be deemed as limited to the embodiments of a specific material of the mechanical wire or a specific number of electrical pathways provided by the cable 200.

As illustrated in FIGS. 2 and 3, the cable 200 may connect the alarm box 2 and/or the power source 3 to the photo emitter 100, the photo receiver 102, the first micro-controller 39*a*, the second micro-controller 39*b*, the device 11 and/or the sensor board 36. The cable 200 may be fastened to the base 12. Further, the cable 200 may be connected to the light emitting source 106 and/or the light detector 108. The cable 200 may be attached to the alarm box 2. As a result, the alarm box 2 and/or the power source 3 may be in communication with the photo emitter 100, the photo receiver 102, the first micro-controller 39*a*, the second micro-controller 39*b*, the light emitting source 106, the light detector 108, the device 11 and/or the sensor board 36.

The device 11 may be positioned on the top side 54 of the top cover 52. The underside 13 of the device 11 may be adjacent to and/or may abut the top side 54 of the top cover 52 of the base 12. The mounting hole may be aligned with the opening 66, the opening 48, and the opening 82 of the top cover 52, the sensor board 36 and the bottom cover 68, respectively. As a result, the mounting hole may be aligned with the opening 26 of the base 12.

As illustrated in FIG. 1, the system 10 may include a screw 300, a washer 301 and/or a spring 302. The screw 300 may include grooves 304, a base 306 and/or a tip 308. The spring 302 may be positioned around the grooves 304 of the screw 300. The spring 302 may be positioned between the tip 308 and the base 306 of the screw 300. The washer 301 may be positioned around the grooves 304 between the tip 308 and the base 306 of the screw 300. The screw 300 and the spring 302 may be inserted into the base 12. The grooves 304 of the screw 300 may be inserted into the opening 26, the opening 48, the opening 66 and/or the mounting hole of the device 11, the sensor board 36, the top cover 52 and/or the device 11, respectively. The base 306 of the screw 300 may be positioned in the base 12 and/or the tip 308 of the screw 300 may abut the device 11. The grooves 304 of the screw 300 may extend into the device 11 and/or the screw 300 may be attached to the device 11. As a result, the device 11 is attached to the base 12, the cable 200, the alarm box 2 and/or the power source 3. The bottom cover 68 may be attached to the bottom side 18 of the base 12. The head 306 of the screw 300 may be enclosed by the base 12 and the bottom cover 68. As a result, the screw 300 may not be removed from the base 12 without removing the bottom cover 68 of the base 12.

The voltage plug 124 may be inserted into the DC plug-in 17 of the device 11 and/or may be connected to the second micro-controller 39*b* and/or the power source 3 as illustrated in FIG. 2. As a result, the device 11 may be in communication with the electrical resistor 41 and/or the second micro-controller 39*b*. The electrical resistor 41 may determine the required operational voltage of the device 11. Alternatively, the second micro-controller 39*b* may be programmed to determine the required operational voltage of the device 11 via the electrical resistor 41. The second micro-controller 39*b* may communicate with the device 11 and/or may communicate the required operational voltage of the device 11 to the power source 3. The second micro-controller 39*b* may deliver the required operational voltage of the device 11 via the electrical resistor 41, the first cord 120, the voltage plug 124 and/or the DC plug-in 17.

In another embodiment, the second micro-controller 39*b* may be programmed with the required operational voltage of the device 11. The second micro-controller 39*b* may control the voltage emitted by the power source 3. Further, the power source 3 may provide the required operational voltage to the device 11 via the cable 200, the first cord 120, the second micro-controller 39*b*, the voltage plug 124 and/or the plug-in 17. As a result, the second micro-controller 39*b* may allow the device 11 to be activated and/or to be operated.

The second micro-controller 39*b* may be connected to the first LED 50*a*. The power source 3 may be connected to and/or may control the first LED 50*a*. Still further, the second micro-controller 94 may control the first LED 50*a*. The first LED 50*a* may emit a color, such as, for example, green. The power source 204 and/or the second micro-controller 39*b* may activate the first LED 50*a* to indicate that the voltage is being supplied to the device 11. The second LED 50*b* may emit a color, such as, for example, red. The first micro-controller 39*a* may be programmed to control the second LED 50*a*. The first LED 50*a* and/or the second LED 50*b* may emit light which may be visible through the first hole 32*a* and/or the second hole 32*b*, respectively. The present invention should not be deemed as limited to the color emitted by the first LED 50*a* and/or the second LED 50*b*.

The device 11 may, therefore, be activated with the required operational voltage provided from the power source 3. The first LED 50*a* may be activated by the power source 3 and/or the second micro-controller 39*b* to indicate that the device 11 has been activated. Alternatively, the power source 3 may activate the first LED 50*a* to indicate that the second micro-controller 39*b* may be receiving the output voltage from the power source 3 via the cable 200.

The device 11 may have a removable attachment 21. The removable attachment 21 may be attached to, may be coupled with and/or may be connected to the device 11. For example, the device 11 may be a digital camera and the removable attachment 21 may be, for example, a digital camera lens, a digital camera filter, a memory card, a battery cover, a lens cover, a wireless adaptor, a remote control and/or the like. Alternatively, the device 11 may be a cellular telephone and the removable attachment 21 may be, for example, a headset, a battery cover, a wireless head set, a data transfer adapter, a hands-free headset, a wireless speaker and/or the like. In another embodiment, the device 11 may be a PDA and the removable attachment 21 may be, for example, a personal computer card, a wireless adapter, a battery cover, ear plugs, a wireless headset, a keyboard, an expansion card, a media card and/or the like. The present invention should not be deemed as limited to a specific embodiment of the device 11 and/or the removable attachment 21.

As illustrated in FIG. 2, the device 11 may be, for example, a digital camera and/or the removable attachment 21 may be, for example, a digital camera lens. The attaching means 126 may be attached to and/or may be connected to the removable attachment 21 of the device 11 by, for example, an adhesive, a magnet, and/or the like. Connecting the attaching means 126 to the removable attachment 21 may close a circuit within the attaching means 21, the connector plug 14 and/or the first micro-controller 39*a*. As a result, the first micro-controller 39*a* may activate the second LED 50*b* to indicate that the removable attachment 21 is secured to the connector plug 14 and/or the base 12.

The attaching means 126 may detect removal of and/or separation of the removable attachment 21 of the device 11 from the attaching means 126, the device and/or the base 12. The first micro-controller 39*a* may deactivate the second LED 50*b* to indicate that the removable attachment 21 is detached from the attaching means 126, the base 12 and/or the device 11. The first micro-controller 39*a* may signal the alarm box 2 that the removable attachment 21 is detached from the attaching means 126, the base 12 and/or the device 11. As a result, the alarm box 2 may be activated and/or may produce an audio signal.

The photo emitter 100 and/or the light emitting source 106 may be in communication with the power source 3 and/or the alarm box 2. The photo emitter 100 and/or the light emitting source 106 may be controlled by the alarm box 2 and/or the power source 3. The screw 300 may be inserted into the opening 82 of the bottom cover 68 of the base 12. Attaching the screw 300 and/or the base 12 to the device 11 may activate the photo emitter 100 and/or the photo receiver 102. As a result, the light emitting source 106 may be activated and/or may transmit electromagnetic radiation to the light detector 108. The light detector 108 may receive, may monitor and/or may detect the electromagnetic radiation from the light emitting source 106. The light detector 108 may be in communication with the alarm box 2 and/or may provide a signal indicate to the alarm box 2 that the light detector 108 may be receiving electromagnetic radiation from the light emitting source 106.

As illustrated in FIGS. 1 and 3, the photo receiver 102 and/or the light detector 108 may be in communication with the alarm box 2 to indicate that the light detector 108 is receiving and/or is detecting electromagnetic radiation emitted from the light emitting source 106. The electromagnetic radiation from the light emitting source 106 may be interrupted and/or may be impeded by a condition. The condition may prevent the light detector 108 from receiving the electromagnetic radiation from the light emitting source 106. The condition interrupting the electromagnetic radiation may occur momentarily or may occur indefinitely. Alternatively, the condition may not entirely interrupt the electromagnetic radiation from the light emitting source 106.

The condition may relate to detaching, separating and/or unsecuring the device 11 from the base 12, the structural element, and/or the alarm box 2. The screw 300 and/or the screw 302 may be positioned inside the base 12. The spring 302 may be positioned between the head 306 of the screw and the base 12. As a result, the spring 302 may be compressed between the head 306 of the screw 300 and the base 12. The screw 300 may extend outward with respect to the base 12 and may attach the device 11 to the base 12, the alarm box 2. As a result, the device 12 may be secured to the base 12, the alarm box 2.

A theft of the device 11 may separate the device 11 from, may remove the device 11 from and/or may separate the device 11 from the base 12, the spring 300, the structural element and/or the alarm box 2. As a result, the screw 300 and/or the spring 302 may be detached from the device 11. The spring 302 may decompress and/or may force the screw 300 inward with respect to the top cover 54. The spring 302 may force the head 306 of the screw 300 inward with respect to the top side 74 of the bottom cover 68. The head 306 of the screw 300 may abut the top side 74 of the bottom cover 68. As a result, the screw 300, the head 306 of the screw 300 and/or the washer 301 may move inward with respect to the bottom cover 68. The screw 300, the head 306 of the screw 300 and/or the washer 301 may be positioned between the light emitting source 106 and the light detector 108 after being detached from the device 11. The screw 300, the head 306 of the screw 300 and/or the washer 301 may interrupt the electromagnetic radiation received by the light detector 108 from the light emitting source 106. As a result, the condition may occur because the screw 300, the head 306 of the screw 300 and/or the washer 301 has interrupted the electromagnetic radiation.

The condition may relate to inserting a tool (not shown in the drawings) into the opening 82 of the bottom cover 68. The tool may be, for example, a screw driver, a wrench, a wire and/or the like. The tool may be inserted into the opening 82 of the bottom cover 68 to engage and/or to remove the screw 300 from the device 11 and/or the base 12 in an attempt to steal the device 11. The tool may extend inward with respect to the base 12. As a result, the tool may be inserted between the light emitting source 106 and the light detector 108. The tool may interrupt the electromagnetic radiation received by the light detector 108 from the light emitting source 106. As a result, the condition may occur because the tool interrupts the electromagnetic radiation between the light detector 108 and the light emitting source 106.

The condition may prevent the photo receiver 102 and/or the light detector 108 from detecting the electromagnetic energy emitted from the light emitting source 106. The photo receiver 102 and/or the light detector 108 may provide a signal to the alarm box 2 that the condition has occurred. As a result, the alarm box 2 may be activated and/or may produce the audio signal. The first micro-controller 39*a*, the photo emitter 100, the photo receiver 102, the light emitting source 106, the light detector 108, the power source 204, the alarm box 202 and/or the cable 200 may electrically secure the device 11. As a result, the alarm box 2 may produce the audio signal which may indicate that electromagnetic radiation has been interrupted and/or that the device 11 is unsecured.

As illustrated in FIGS. 1 and 2, the attaching means 126 may communicate to the first micro-controller 39*a* if the removable attachment 21 of the device 11 has been removed from the attaching means 126 and/or if the circuit formed by the attaching means 126 and the removable attachment 21 has been broken by, for example, snipping and/or cutting the cord 122. The second micro-controller 39*b* may detect that the voltage plug 124 has been removed from the device 11. The first micro-controller 39*a* and/or the second micro-controller 39*b* may communicate to the alarm box 2 that the second cord 122 and/or the first cord 120, respectively, are separated from the device 11. As a result, the first micro-controller 39*a* and/or the second micro-controller 39*b* may de-activate the second LED 50*b* and/or the first LED 50*a*, respectively. The first micro-controller 39*a* and/or the micro-controller 39*b* may signal the alarm box 2. The alarm box 2 may be activated and/or may produce the audio signal which may indicate that the first cord 120 and/or the second cord 122 may have been removed from the device 11 and/or the removable attachment 45 and/or that the device 11 and/or the removable attachment 45 may be unsecured. A user (not shown in the drawings) and/or a customer (not shown in the drawings) may examine, may inspect and/or may utilize the device 11 which may be attached to the cable 200. As a result, the user and/or the customer may move the device 11 allowing examination and/or inspection of the device 11, the removable attachment 45. The user may examine and/or may inspect, for example, a weight of the device 11 and/or the removable attachment 45, a configuration of the device 11 and/or the removable attachment 45, a texture of an exterior of the device 11 and/or the removable attachment 45 and/or the like. As a result, a user having a disability, such as, for example, being confined to a wheelchair may be permitted to examine and/or to inspect the device 11 and/or the removable attachment 45 which may be attached to the cable 200. Moreover, the device 11 and/or the removable attachment 45 may remain electrically and/or mechanically secured to the base 12, the alarm box 2 and/or the structural element via the cable 200 as the device 11 and/or the removable attachment 45 may be examined and/or inspected. The user may activate and/or may utilize the device 11 and/or the removable attachment 45 to perform the functions provided by the device 11. For example, the device 11 may be a digital camera and the user may use the device 11 to perform the function of capturing an image (not shown in the drawings). As a result, the device 11 may display the image thereon. The user may examine and/or inspect the image captured by the device 11.

As illustrated in FIGS. 1-3, the system 10 may be attached to the device 11 to secure the device 11 to the base 12, the alarm box and/or the structural element via the cable 200. Further, the system 10 may connect the device 11 to the alarm box 2 and/or the power source 3 via the sensor board 36, the base 12, the cable 200, the first micro-controller 39*a*, the second micro-controller 39*b*, the photo emitter 100 and/or the photo receiver 102. The second micro-controller 39*b* of the sensor board 36 may be in communication with the first micro-controller 39*a* via the base 12 and/or the cable 200. Still further, the device 11 may be monitored by the alarm box 2, the photo emitter 100, the photo receiver 102, the first micro-controller 39*a*, the second micro-controller 39*b* and/or the cable 200. The second micro-controller 39*b* and/or the first micro-controller 39*a* may control the voltage delivered from the power source 3 to the device 11. Moreover, the first LED 50*a* and/or the second LED 50*b* of the sensor board 36 may indicate that power is provided to the device 11 and/or that the alarm box 2 may have been activated, respectively. The cable 200 and/or the base 12 may allow the device 11 to be manipulated, to be examined and/or to be utilized by a customer and/or a user. Furthermore, it should be understood that the first micro-controller 39*a* and/or the power source 3 may be in communication with more than one device 11, the first micro-controller 39*a*, the second micro-controller 39*b*, the sensor board 36, the base 12, the power source 3 and/or the cable 200.

The system 10, the base 12 and/or the screw 300 may secure the device 11 and/or the removable attachment 45 with the photo emitter 100 and/or the photo receiver 102. As a result, the device 11 and/or the removable attachment 45 may be secured to the structural element via the cable 200. The photo emitter 100 and/or the photo receiver 102 may be in communication with the alarm box 2 and/or the power source 3 via a cable 200 to secure the device 11 and/or the removable attachment 45. The base 12 may have the first LED 50*a* and/or the second LED 50*a* to indicate that a voltage may be provided to the device 11 and/or to indicate that the device 11 and/or the removable attachment 45 may be separated from the base 12. As a result, the system 10, the photo emitter 100 and/or the photo receiver 102 may electronically secure and/or may mechanically secure the device 11 and/or the removable attachment 45 of the device 11 to the structural element.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. An apparatus for securing a device wherein the device has a removable attachment thereon, the apparatus comprising:

a base having walls defining an interior wherein the base has a top side and a bottom side opposite to the top side wherein the top side of the base attaches to the device wherein the base has an opening extending through the base from the interior to the top side and further wherein the bottom side has an orifice which extends from the interior of the base to a point exterior of the base;

an optical sensor positioned on the interior of the base wherein the optical sensor is adjacent to the orifice on the bottom side of the base and further wherein the optical sensor detects a signal wherein the signal is transmitted across the orifice on the bottom side of the base;

a screw having a base and a tip opposite to the base wherein the base of the screw is positioned inside the opening within the interior of the base wherein the tip of the screw extends outward with respect to the top side of the base and further wherein the tip of the screw attaches the device to the base; and an alarm in communication with the optical sensor wherein a condition interrupts the signal received by the optical sensor and the alarm is activated.

2. The apparatus of claim 1 wherein the signal is electromagnetic energy.

3. The apparatus of claim 1 further comprising:

a resistor within the interior of the base connected to the device.

4. The apparatus of claim 1 further comprising:

a cable connecting the alarm to the optical sensor and the device.

5. The apparatus of claim 1 further comprising:

a plug insertable into the base to connect the removable attachment and the device to the alarm.

6. The apparatus of claim 1 further comprising:

a power source connected to the device and the optical sensor.

7. The apparatus of claim 1 further comprising:

a micro-controller within the interior of the base communicating with the optical sensor and the alarm.

8. The apparatus of claim 1 further comprising:

a light emitting diode within the base connected to the optical sensor.

9. A system for securing a device to a structural element, the system comprising:

a base having an interior wherein the base has a top side and a bottom side opposite to the top side wherein a first opening extends through the base from the interior to the top side of the base wherein a second opening extends through the base from the interior to the bottom side of the base;

an attaching means within the interior of the base wherein the attaching means extends outward with respect to the first opening of the base connecting the base to the device wherein the top side of the base abuts the device;

an optical sensor within the interior of the base wherein the optical sensor is connected to an alarm box and a power source wherein the optical sensor communicates with the alarm box and further wherein the optical sensor is adjacent the second opening of the base; and a light emitting source within the interior of the base wherein the light emitting source is connected to the power source wherein the optical sensor receives a signal transmitted across the second opening from the light emitting source wherein the optical sensor detects a first condition indicating the device is secured to the base wherein the signal in the first condition is continuously received by the optical sensor wherein the optical sensor detects a second condition wherein the second condition interrupts the signal received by the optical sensor and further wherein the optical sensor activates the alarm box.

10. The system of claim 9 wherein the light emitting source is a light emitting diode.

11. The system of claim 9 further comprising:

a removable attachment of the device connectable to the alarm box.

12. The system of claim 9 wherein the signal is electromagnetic radiation.

13. The system of claim 9 further comprising:

a micro-controller in communication with the alarm box and the optical sensor.

14. The system of claim 9 further comprising:

a plug insertable into the base to connect the device to the alarm box.

15. The system of claim 9 further comprising:

a plug insertable into the base to connect the device to the power source.

16. A method for securing a device and a removable attachment of the device, the method comprising the steps of:

providing a base having an interior, a top side and a bottom side opposite to the top side wherein a passage extends through the base from the bottom side to the top side of the base;

attaching the base to the device with a fastener wherein the fastener is defined by a length between a tip and a base of the fastener wherein the tip of the fastener extends outward with respect to the passage at the top side of the base and attaches to the device wherein the base of the fastener is within the interior of the base;

emitting a signal from a light emitting source within the interior of the base wherein the light emitting source is attached to a power source;

receiving the signal with a detector within the interior of the base wherein the signal is continuously received by the detector wherein the device is secured to the base and further wherein the signal is transmitted across the passage at the bottom side of the base; and activating an alarm indicating a condition has occurred wherein the condition is detected by the detector and further wherein the condition is an interruption of the signal received by the detector.

17. The method of claim 16 further comprising the step of:

providing a micro-controller in communication with the alarm and the detector.

18. The method of claim 16 further comprising the step of:

providing a voltage to the device.

19. The method of claim 16 further comprising the step of:

connecting the removable attachment of the device to the alarm.

20. The method of claim 16 further comprising the step of:

indicating the device or the removable attachment of the device connected to the alarm.

* * * * *